United States Patent [19]

Igarashi et al.

[11] Patent Number: 4,538,475
[45] Date of Patent: Sep. 3, 1985

[54] SPEED-CHANGING TRANSMISSION DEVICE FOR VEHICLES

[75] Inventors: Takashi Igarashi; Nakashiro Mukai; Haruki Otsuki, all of Matsuyama, Japan

[73] Assignee: Iseki & Co., Ltd., Matsuyama, Japan

[21] Appl. No.: 524,322

[22] Filed: Aug. 18, 1983

Related U.S. Application Data

[63] Continuation of Ser. No. 252,845, Apr. 10, 1981, abandoned.

[51] Int. Cl.³ .............................................. F16H 3/08
[52] U.S. Cl. ...................................... 74/368; 74/364; 192/3 H
[58] Field of Search ................. 74/368, 364, 366, 363; 192/3 H, 13 R, 13 A

[56] References Cited

U.S. PATENT DOCUMENTS

| | | | |
|---|---|---|---|
| 1,599,389 | 9/1926 | Aiken | 188/82 |
| 1,864,142 | 6/1932 | Meyer | 188/82 |
| 2,342,960 | 2/1944 | Neracher et al. | 74/364 |
| 2,567,446 | 9/1951 | Polomski | 74/368 |
| 3,424,033 | 1/1969 | Croswhite | 74/368 |

FOREIGN PATENT DOCUMENTS

| | | | |
|---|---|---|---|
| 0622472 | 12/1962 | Belgium | 74/368 |
| 0615143 | 1/1949 | United Kingdom | 74/368 |

Primary Examiner—George H. Krizmanich
Assistant Examiner—Dirk Wright
Attorney, Agent, or Firm—Arthur T. Fattibene

[57] ABSTRACT

A speed-changing transmission device for vehicles includes a speed-changing shaft connected to rear wheels and disposed at the rear side of an input shaft driven by an engine co-axially with the input shaft, a counter shaft mounted in parallel with the speed-changing shaft and driven by the input shaft, and forward and backward speed-changing gear systems through which the speed-changing gear is connected to the counter shaft to constitute a speed-changing transmission mechanism. A forward one-way clutch is disposed between the input shaft and the speed-changing shaft of the speed-changing mechanism. In the power transmission path formed by the backward speed-changing gear system, provided is a backward clutch and a backward one-way clutch parallel with the backward clutch. The connection between the engine and the speed-changing the speed is turned into "OFF" state during parking of the vehicle, so that an engine braking effect is obtained to prevent the vehicle from starting naturally.

5 Claims, 5 Drawing Figures

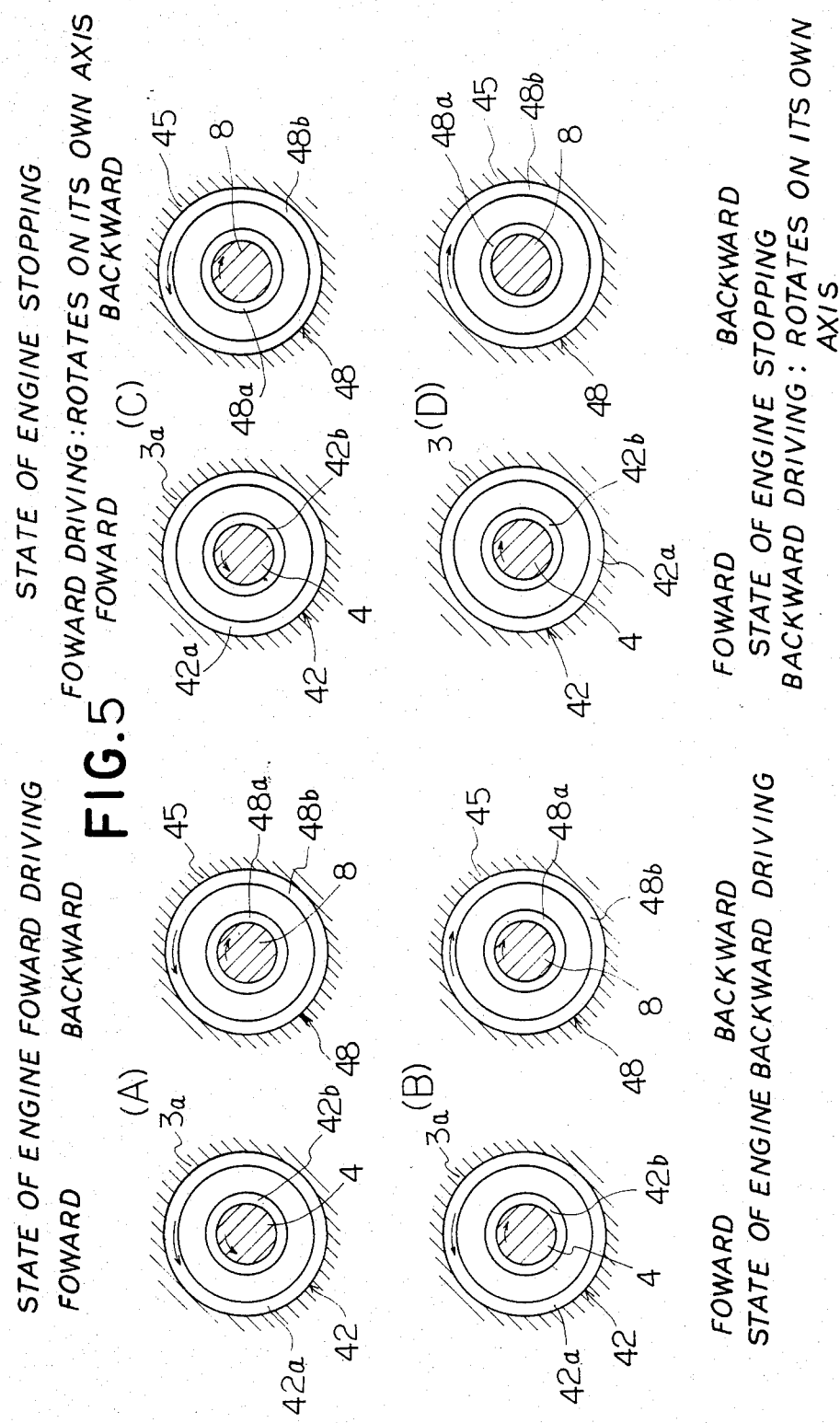

ical machine to which a device of a first embodiment of the invention is applied;
SPEED-CHANGING TRANSMISSION DEVICE FOR VEHICLES

CROSS REFERENCE TO RELATED APPLICATIONS

This is a continuation application of Application Ser. No. 06/252,845 filed Apr. 10, 1981, now abandoned, for Speed Changing Transmission Device for Vehicles.

BACKGROUND OF THE INVENTION

1. Field of the Invention

The present invention relates to a speed-changing transmission device for vehicles and, more particularly, to an improvement in a speed-changing transmission device for vehicles, of the type having a counter shaft adapted to be driven by an input shaft which in turn is driven by an engine, a transmission shaft for driving a wheel axle or the like, the counter shaft and the speed-changing shaft being connected to each other through a forward transmission gear system and also through a backward transmission gear system, and clutches disposed in respective transmission paths and adapted to be selectively used to effect the changing of the speed.

2. Description of the Prior Art

In the conventional speed-changing transmission device for vehicles, when, for example, the pressure of the oil for operating the clutch for changing the speed is lowered due to the stop of the engine during parking, the clutch takes the "OFF" state to disconnect the driving wheel axle or the like from the engine. In this state, it is not possible to utilize the engine braking effect which is quite useful particularly when the vehicle is parked on a steep slope. In such a case, if the parking brake is operated insufficiently, the vehicle will naturally start dangerously. It is also to be pointed out that, in the event of an excessive discharge of the battery, it is not possible to start the engine by pushing the vehicle manually, because the driving wheel axle is disconnected from the engine.

SUMMARY OF THE INVENTION

It is, therefore, an object of the invention to provide a speed-changing transmission device in which, even when the clutch for the speed-changing becomes inoperative or to take the "off" state during parking a direct connection is maintained between the engine and the driving wheel axle or the like to ensure the engine braking effect during parking.

According to the invention, the above stated object is achieved by a speed-changing transmission device having the following features.

Namely, the invention provides a speed-changing transmission device comprising: a speed-changing gear for transmitting the torque to the driving wheel axle or the like and mounted at the rear side of an input shaft driven by the engine coaxially with the input shaft, a counter shaft mounted in parallel with the speed-changing shaft and carrying a counter gear always meshing with an input gear on the input shaft, a forward speed changing gear system provided on the speed-changing shaft and the counter shaft, the forward speed changing gear system including a forward speed-changing gear and a forward counter gear which are meshing with each other and adapted to transmit the rotation of the counter shaft to the speed-changing shaft at a speed reduced as compared with the speed of the input shaft or in the reverse direction to the rotation of the input shaft, a backward speed-changing gear system provided on the speed-changing shaft and the counter shaft, the backward speed-changing gear system including a backward speed changing gear, a backward idle gear and a backward counter gear, a clutch disposed between the input shaft and the speed-changing shaft and clutches disposed in the transmission paths provided by respective speed-changing gear systems between the input shaft and the speed-changing shaft, the clutches being usable selectively, a one-way clutch for forward driving disposed between the input shaft and the speed-changing shaft, and a one-way clutch for backward driving disposed between the speed-changing shaft and the backward speed-changing gear system or between the counter shaft and the backward speed-changing gear system.

BRIEF DESCRIPTION OF THE DRAWINGS

FIGS. 5a to 5d are illustrations explanatory of the operation of forward and backward one-way clutches in the embodiment shown in FIG. 4.

DESCRIPTION OF THE PREFERRED EMBODIMENTS

Hereinafter, preferred embodiments of the invention applied to a power agricultural machine will be described with reference to the accompanying drawings.

Figure 1:
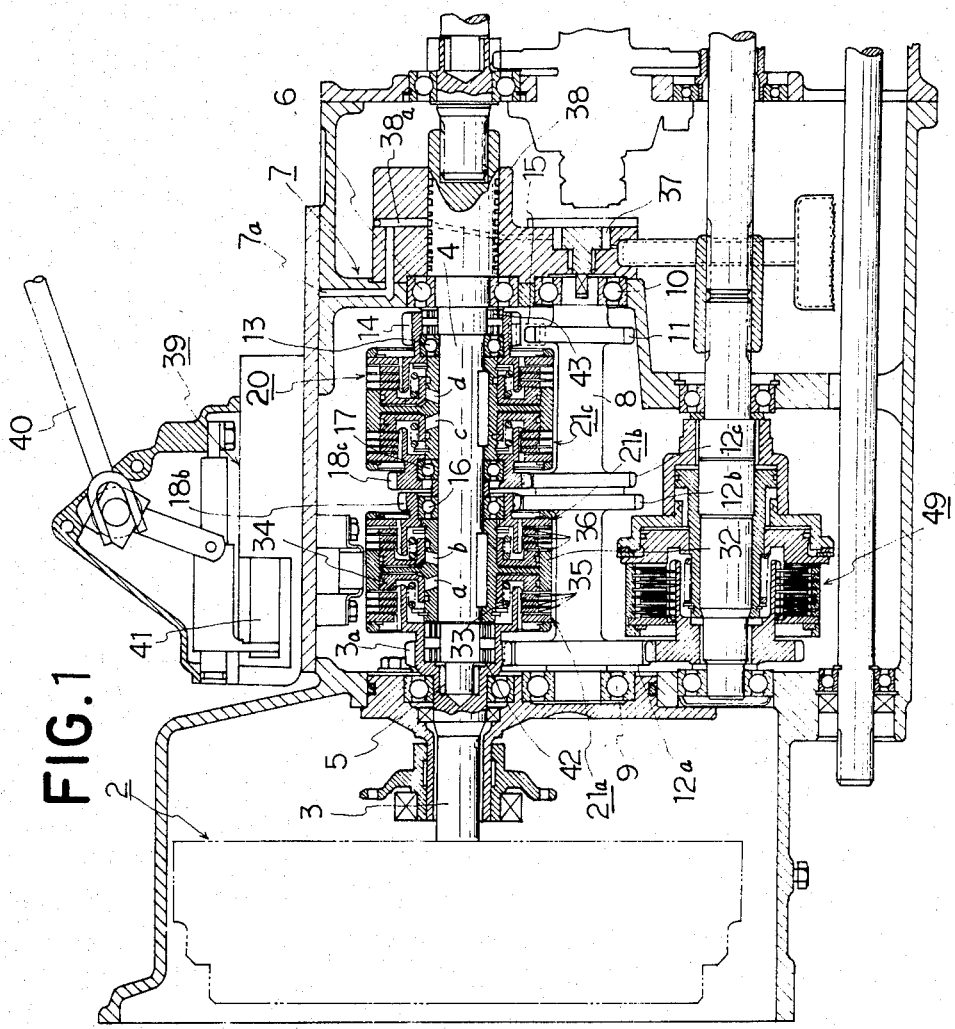
FIG. 1 is a vertical sectional side elevational view of the front portion of transmission case of a power agricultural machine to which a device of a first embodiment of the invention is applied.
Figure 2:
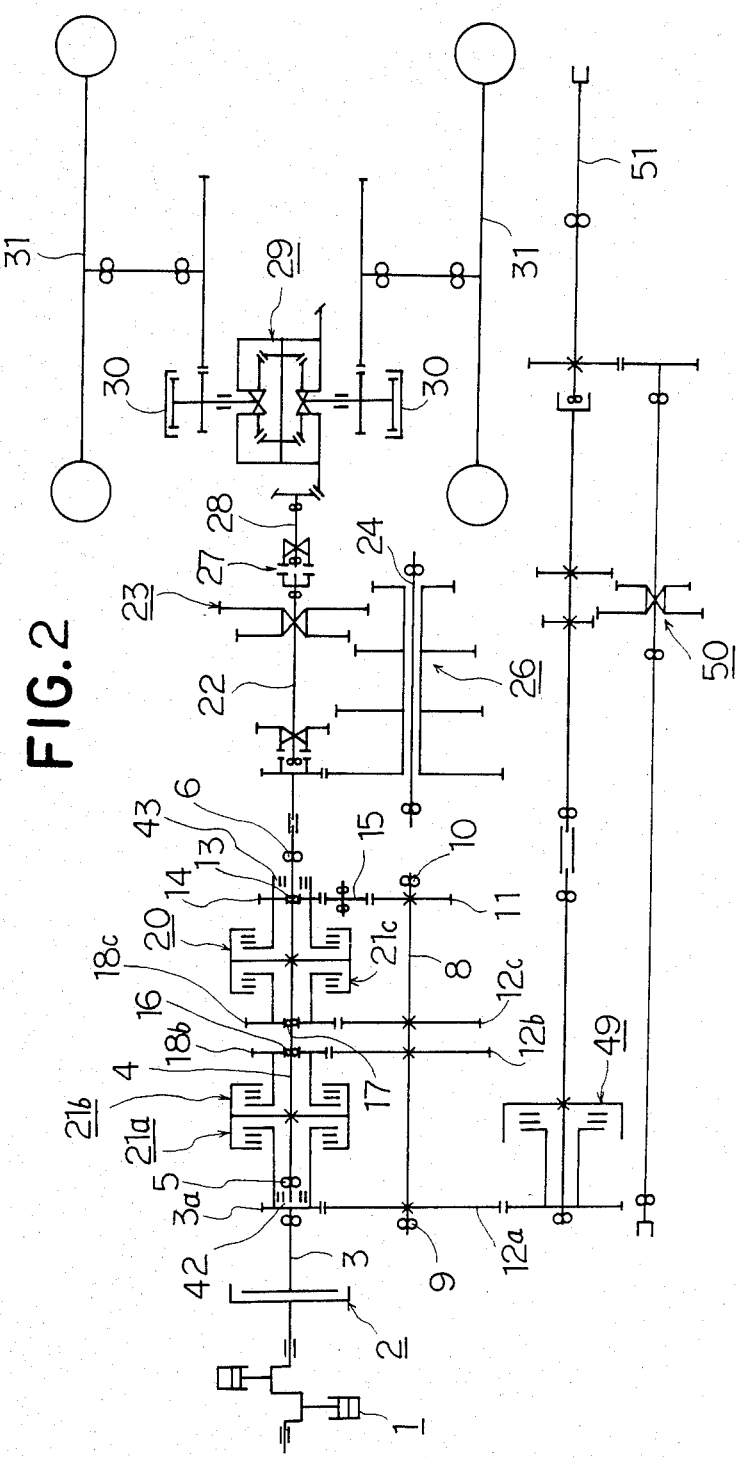
FIG. 2 illustrates the power transmission system of the embodiment shown in FIG. 1.

As will be seen from FIG. 1 showing a vertical section, as well as from FIG. 2 showing the power transmission system schematically, an engine 1 has a crank shaft to which is connected an input shaft 3 through a main clutch 2. A speed-changing shaft 4 is supported at its front end by a bearing 5 and is disposed behind the input shaft 3. The rear end of the speed-changing shaft 4 is supported by a transmission case 7 through a medium of a bearing 6. A counter shaft 8 is mounted in parallel with the speed-changing shaft 4 and supported by bearings 9,10 on the transmission case 7. A counter gear 11 of small diameter for backward driving and counter gears 12b,12c for forward driving having different diameters are carried by the counter shaft 8. A speed-changing gear 14 for backward driving, rotatably mounted on the speed-changing shaft through a bearing 13 meshes through an idle gear 15 for backward driving with a counter gear 11 for backward driving to constitute a backward speed-changing gear system.

Speed changing gears 18b,18c for forward driving, rotatably mounted on the speed-changing shaft 4 through bearings 16,17, engage with counter gears 12b, 12c for forward driving, while an input gear 3a of a small diameter formed at the rear portion of the input shaft 3 meshes with a counter gear 12a of a large diameter to constitute a forward speed-changing gear system.

A clutch 20 for backward driving is connected between the backward speed-changing gear 14 and the speed-changing shaft 4. Also, provided are clutches 21a,21b,21c for forward driving so as to connect speed-changing gears 18b,18c to the clutch shaft 4. These clutches are adapted to be operated selectively.

A second speed-changing shaft 22 is connected to the speed-changing shaft 4 through a gear as shown in FIG. 2. A group 23 of shift gears slidable only in the axial direction along the second speed-changing shaft 22 is adapted to be brought into engagement with a group 25 of second counter gears selectively by means of a mechanical speed-changing device 26. A drive pinion shaft 28 drivingly connected to the second speed-changing shaft 22 through a clutch 27 is adapted to drive left and right rear driving wheels 31, 31 of the vehicle through a rear wheel differential gear device 29. The rear wheels 31 are provided with respective brakes.

The construction of the backward clutch 20 and the forward clutches 21a to 21c will be explained hereinunder with specific reference to the clutch 21a for the forward driving by way of example. The clutch 21a has a clutch housing 32 fitted to the speed-changing shaft 4 and accommodating in an oil-tight manner a piston 34 which is biased in the disengaging direction by means of a spring 33. A friction disc 35 fits in the clutch housing 32 slidably only in the axial direction, while a friction disc 36 is fitted to a hub of an input gear 3a slidably only in the axial direction. A working oil delivered by an oil pump 37 is introduced into a speed-changing switching valve 39 through a relay cylinder 38 fitting the rear end of the speed-changing shaft 4. As the driver manipulates a speed-changing gear lever 40, the spool 41 of the switching valve 39 is slid in the axial direction to distribute the oil selectively from an oil passage 7a in the mission case 7 and an oil passage 38a in the relay cylinder 38 via the oil passages a,b . . . of the clutch housings of clutches selected by the speed-changing lever 40. For instance, assuming here that the pressurized oil is supplied to the rear side of a piston 34 via the oil passage a, the piston 34 makes the frictional discs 35,36 engage with each other thereby to connect the input gear 3a to the speed-changing shaft 4.

Thus, the power transmission provided by the mutual engagement between the forward counter gear 12c and the forward speed-changing gear 18c, caused by the engaging operation of the forward clutch 21c, provides a rotation speed of first forward speed ($V_1$), which is the lowest of the forward speeds, to the speed-changing shaft 4. Similarly, a forward second speed $V_2$ is given through the mutual engagement of the forward counter gear 12b and the forward speed-changing gear 18b as the forward clutch 21b is brought into "ON" state, and the highest forward speed $V_3$ is imparted to the speed-changing shaft 4 as the forward clutch 21a is put into operation, by a direct connection. Also, as the backward clutch 20 is put into operation, a backward first speed $R_1$ is imparted to the speed-changing shaft 4 through the backward counter gear 11, backward idle gear 15 and the backward speed-changing gear 14.

Figure 3:
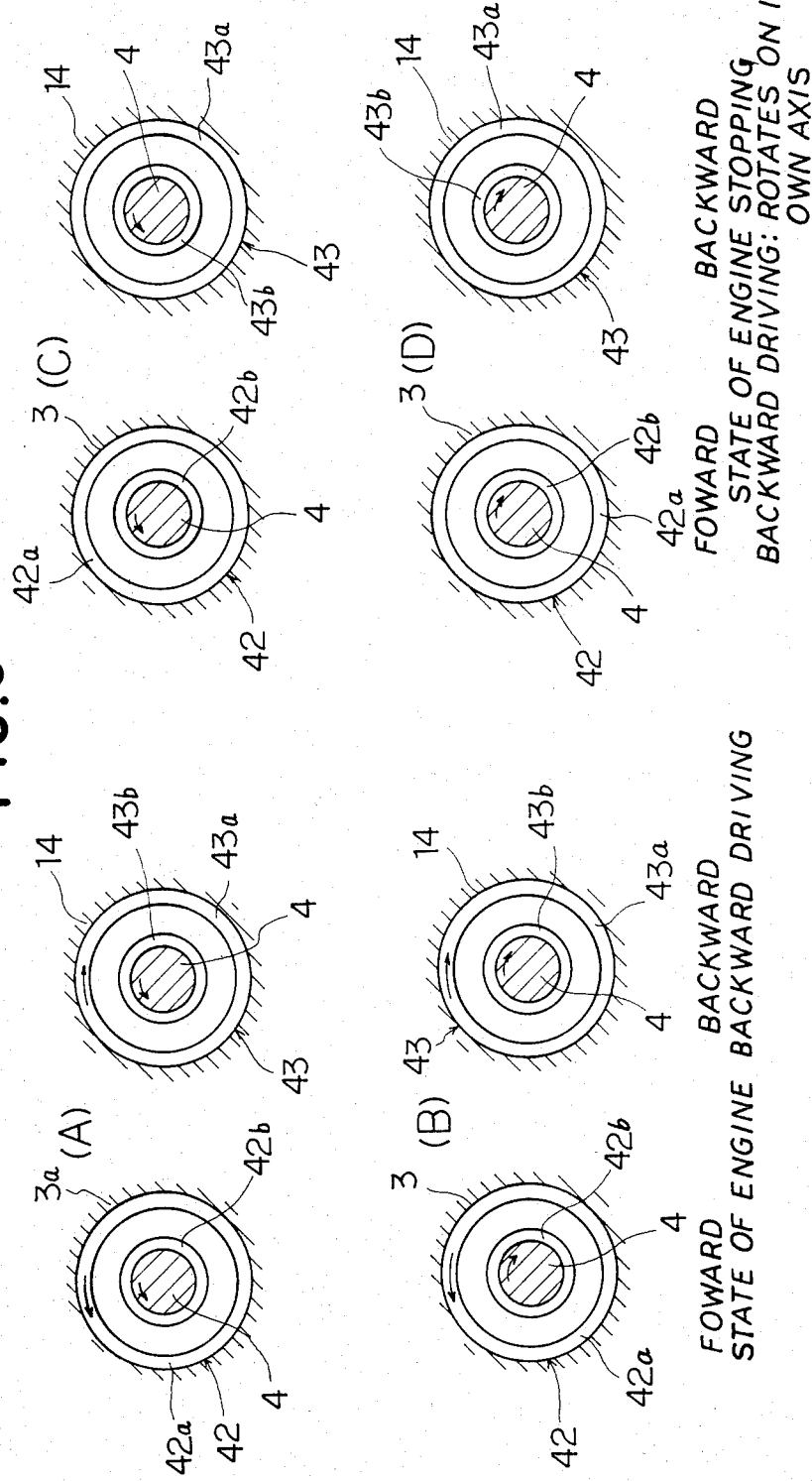
FIGS. 3a to 3d are illustrations explanatory of the operation of forward and backward one-way clutches in the embodiment shown in FIG. 1.

The input gear 3a is coupled to the speed-changing gear 4 through a one-way clutch 42 which can deliver to the input shaft 3 only the forward driving power from the speed-changing shaft 4. Namely, as shown in FIG. 3a, an outer wheel 42a fitted around the input gear 3a is adapted to rotate counter-clockwise as viewed from the rear side. This outer wheel 42a makes a counter-clockwise rotation relative to an inner wheel 42b fitting the speed-changing shaft 4 which rotates in the same direction as the input shaft 3 at the forward first or second speeds $V_1,V_2$ which is lower than the speed of the input shaft 3. Therefore, the input gear 3a and the speed-changing shaft 4 rotate freely from each other. The outer wheel 42a making a counter-clockwise rotation relative to the inner wheel 42b and the input gear 3a can rotate freely from each other also when the speed-changing shaft 4 makes a clockwise rotation as shown in FIG. 3b. However, when in the state shown in FIG. 3c in which the inner wheel 42b makes a counter clockwise rotation relative to the outer wheel 42a, the speed-changing gear 4 and the input gear 3a rotate as a unit with each other by the action of the one-way clutch 42.

The backward speed-changing gear 14 is connected to the speed-changing shaft 4 through a one-way clutch 43 which can deliver to the backward speed-changing gear 14 only the backward driving power from the speed-changing shaft 4. Namely, the outer wheel 43a fits to the speed-changing gear 14 which is adapted to rotate only in the clockwise direction as viewed from the rear side as shown in FIG. 3a. This outer wheel 43a rotates freely from an inner wheel 43b which rotates counter-clockwise at the forward first or second speed $V_1,V_2$. However, in the state shown in FIG. 3d in which the inner ring 43b makes a clockwise rotation relatively to the outer wheel 43a as mentioned later, the speed-changing gear 14 and the speed-changing shaft 4 rotate as a unit with each other by the action of the one-way clutch 43.

Figure 4:
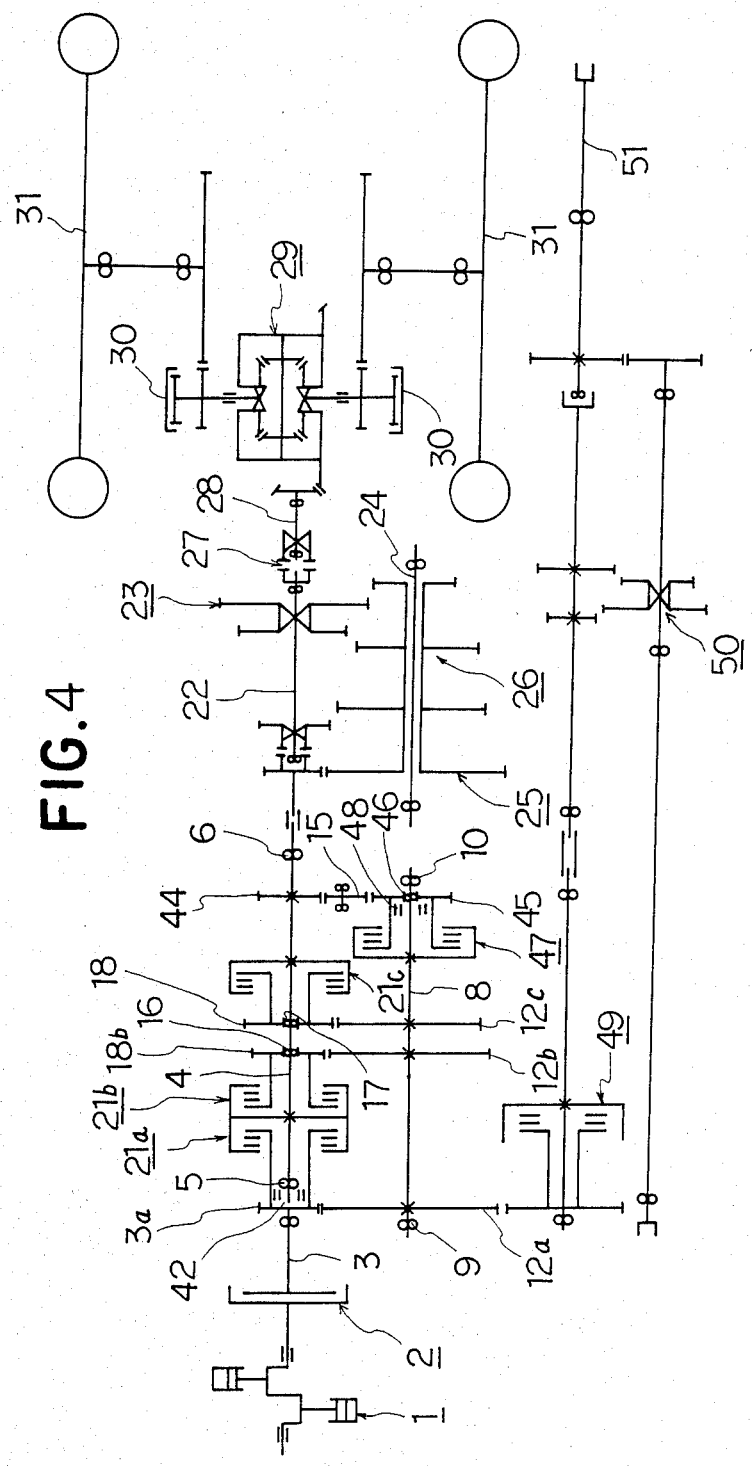
FIG. 4 illustrates the power transmission system of a second embodiment of the invention.

In another embodiment shown in FIG. 4, a backward speed-changing gear 44 is fitted to the speed-changing shaft 4, while a backward counter gear 45 for engagement with the backward idle gear 15 is rotatably carried by the counter shaft 8 through a bearing 46. The backward counter gear 45 is connected to the counter shaft 8 through a backward clutch 47 having a clutch housing fitting the counter shaft 8. Also, a one-way clutch 48 for backward driving is disposed to provide a connection between the backward clutch 48 and the counter shaft 8. The one-way clutch 48 is of the type capable of delivering to the counter shaft 8 only the forward driving power from the backward counter gear 45.

Namely, when the inner wheel 48a fitting to the counter shaft 8 rotating clockwise as viewed from the rear side makes a clockwise rotation relatively to the outer wheel 48b fitting to the backward counter gear 45 as shown in FIG. 5a, the inner wheel 48a and the outer wheel 48b can rotate independently of each other. However, in the state shown in, for example, FIG. 5d in which the outer wheel 48b makes a clockwise rotation relatively to the inner wheel 48a, the backward counter gear 45 and the counter shaft 8 rotate as a unit with each other by the action of the one-way clutch 48.

In the powered agricultural machine as shown in the drawings, the torque of the counter gear 12a is adapted to be transmitted to a power shaft 51 through a PTO clutch 49 and a PTO gear unit 50.

In the illustrated and described embodiments, the forward speed changing gear system and the backward speed-changing gear system are adapted to be operated by means of hydraulically actuated clutches. The invention, however, can be equally applied to the systems having mechanically actuated clutches.

The operation of the speed-changing transmission device of the invention can be achieved even when the forward clutch 21a is eliminated.

In the speed-changing transmission device of the first embodiment of the invention, as the forward clutches 21c,21b are operated selectively, the speed-changing shaft rotates at a forward first or second speed $V_1,V_2$ which is higher than that of the input shaft 3. Therefore, the input gear 3a, rotating counter-clockwise relatively to the speed-changing shaft 4 as viewed from the rear side can rotate freely. As to the backward one-way clutch 43, the backward speed-changing gear 14 rotating clockwise relatively to the speed-changing shaft 4 can be rotated freely. Therefore, the torque of the input shaft 3 is transmitted through the forward clutch 21c or 21b to the speed-changing gear 4 to drive the latter at a reduced speed of forward first or second speeds $V_1, V_2$ corresponding to the selection of the clutch.

When the backward clutch 20 is put into operation, the forward one-way clutch 42 is freed as is the case of FIG. 3a, as shown in FIG. 3b, so that the inner and outer wheels 43b and 43a of the backward one-way clutch 43 rotate unitarily with each other to drive the speed-changing shaft 4 at a predetermined backward speed.

In the event that the vehicle starts to move naturally when it is parked on a slope, the backward one-way clutch 43 is freed as shown in FIG. 3c, as is the case of FIG. 3a, but the inner wheel 42b and the outer wheel 42a are locked to each other because the inner wheel 42b of the forward one-way clutch 42 rotates counter-clockwise together with the speed-changing shaft 4 to realize such a state that the outer wheel 42a makes a clockwise rotation relatively to the inner wheel 42b. Therefore, the torque of the speed-changing shaft 4 is transmitted to the engine 1 through the input shaft 3 to achieve the engine braking effect thereby to automatically stop the natural running of the vehicle.

When the automobile is parked on a slope with its front side directed toward the higher side of the slope, the outer wheel 43a of the backward one-way clutch 43 tends to make a counter-clockwise rotation relatively to the speed-changing shaft 4 as shown in FIG. 3d, so that the inner wheel 43b and outer wheel 43a are locked to each other so that the torque of the speed-changing gear 4 is transmitted through the backward speed-changing gear 14, backward idle gear 15 and the backward counter gear 11 to the counter shaft 8 and further to the engine through the counter gear 12a and the input gear 3a thereby to effect the engine braking.

In the second embodiment of the invention shown in FIG. 4, the forward one-way clutch 42 operates in the same manner as the described first embodiment. As to the backward one-way clutch 48, the outer wheel 48b fitting the backward counter gear 45 makes a counter-clockwise rotation relative to the inner wheel 48a fitting the counter shaft 8 in the state of forward driving of the vehicle (FIG. 5a) and in the state in which the vehicle is parked with its engine stopped on a descending slope (FIG. 5c). In this state, the inner wheel 48a and the outer wheel 48b are freed. However, these wheels 48a, 48b are made to rotate as a unit with each other as the backward clutch 47 is put into operation. Furthermore, when the vehicle is parked on an ascending slope, the outer wheel 48b tends to rotate clockwise to make a clockwise rotation relatively to the inner wheel 48a as shown in FIG. 5d.

Thus, the one-way clutch 48 is locked so that the torque of the speed-changing shaft 4 is transmitted to the engine 1 through the counter shaft 8 to effect the engine braking. In this state, it is also possible to start the engine by manually pushing the vehicle forwardly.

Thus, according to the invention, the engine braking effect is obtained to prevent the vehicle from automatically running in both of forward and backward directions when the vehicle is parked on a slope for a long time, irrespective of a pressure drop in the hydraulic clutches in the transmission system incorporating hydraulic clutches and irrespective of the "OFF" state of mechanical clutch in the transmission system incorporating mechanical clutches, so as to assist the parking brake in parking the vehicle safely.

In addition, the speed-changing transmission device of the invention permits the engine to be started by a manual pushing of the vehicle in the event of an exhaustion of the battery.

What is claimed is:

1. A speed-changing transmission device for vehicles to impart an engine braking effect on a vehicle in the parked position thereof comprising an engine crankshaft (1) and input shaft (3), a main clutch interposed between said crankshaft (1) and said input shaft (3), a speed-changing shaft (4) for transmitting driving power to the driving wheels of the vehicle, said speed-change shaft (4), being coaxially disposed with said input shaft (3), a counter shaft (8) mounted in parallel with said speed-changing shaft (4), an input gear, a one-way clutch 42 coupling said input gear to said speed-changing shaft 4, said one-way clutch including an outer wheel 42a fitted to the input gear (3a), and an inner wheel 42b fitting the speed-changing shaft which rotates in the same direction as the input shaft in the forward speed of the input shaft whereby the input gear 3(a) and the speed-changing shaft 4 rotate freely of each other in a drive position and whereby said speed-changing shaft (4) and input gear 3(a) rotate as a unit in a parked position, a counter gear 12a connected to said counter shaft (8) disposed always meshing with said input gear 3(a), a forward speed charging gear system provided between said speed changing shaft (4) and said counter shaft (8), and including a forward speed-changing gear (18(b), 18(c) rotatably mounted on said speed-changing shaft 4 and a forward counter meshing gear 12(b), 12(c) connected to said counter shaft (8) meshing with each other so as to transmit the rotation of said counter shaft (8) to said speed-change shaft at a reduced speed as compared to the speed of the input shaft or in the reverse direction to the direction of rotation of said input shaft (3), a backward speed-changing gear system provided between said speed-changing shaft (4) and said counter shaft (8), said backward speed-changing system including a backward speed-changing gear (14) on said speed-change shaft 4, a backward idler gear (15), and a backward counter gear 11 on said counter shaft (8), clutch means disposed in the power transmission path formed by the respective forward and backward changing gear systems adapted to be selectively operated, and a backward one-way clutch 43 cooperatively associated with said backward gear system.

2. A speed-changing transmission device as defined in claim 1, wherein said backward one-way clutch 43 couples said backward speed-change gear to said change speed shaft 4, whereby said backward speed-change gear and said change speed shaft 4 are locked to rotate as a unit in one direction only.

3. A speed-changing transmission device as defined in claim 2, wherein said backward speed-change gear 14 is rotatably journaled on said speed-change shaft 4.

4. A speed-changing transmission device as defined in claim 1, wherein said backward counter gear 45 is rotatably coupled to said counter shaft 8, and said backward one-way clutch 48 couples said backward counter gear 45 to said counter shaft 8.

5. A speed-changing transmission device as defined in claim 4, wherein said backward one-way clutch includes an inner wheel and an outer wheel adapted to rotate independently of each other in one direction, said inner wheel being fitted to said counter shaft 8, and said outer wheel to said counter gear 45, whereby said backward counter gear and counter shaft rotate as a unit when said inner and outer wheels of said backward one-way clutch are rotated in the opposite direction.

* * * * *